(12) United States Patent
Liu

(10) Patent No.: US 7,967,269 B2
(45) Date of Patent: Jun. 28, 2011

(54) ROLLER TYPE ADJUSTABLE SCREEN FIXING APPARATUS

(75) Inventor: Kun-Pei Liu, Taipei County (TW)

(73) Assignee: Portwell, Inc., Jhonghe, Taipei County (TW)

( * ) Notice: Subject to any disclaimer, the term of this patent is extended or adjusted under 35 U.S.C. 154(b) by 190 days.

(21) Appl. No.: 12/232,411

(22) Filed: Sep. 17, 2008

(65) Prior Publication Data

US 2010/0065704 A1 Mar. 18, 2010

(51) Int. Cl.
*E04G 3/00* (2006.01)

(52) U.S. Cl. ............... 248/287.1; 248/274.1; 248/276.1; 248/295.11; 248/298.1; 248/309.1; 248/346.06; 248/231.21; 248/176.3; 248/448; 248/451; 248/316.4; 248/316.6

(58) Field of Classification Search ............... 248/274.1, 248/276.1, 279.1, 281.11, 283.1, 287.1, 295.11, 248/298.1, 448, 451, 316.4, 316.6, 309.1, 248/346.06, 231.21, 176.3; 455/575.1; 74/189.17, 74/109

See application file for complete search history.

(56) References Cited

U.S. PATENT DOCUMENTS

| | | | | |
|---|---|---|---|---|
| 1,071,428 A * | 8/1913 | Jones | ........................... | 248/448 |
| 1,576,154 A * | 3/1926 | Steinman | .................... | 248/448 |
| 1,651,471 A * | 12/1927 | Sawyer | ....................... | 248/448 |
| 3,076,285 A * | 2/1963 | Sparkman | .................... | 248/448 |
| 5,149,032 A * | 9/1992 | Jones et al. | ................... | 248/154 |
| 5,311,791 A * | 5/1994 | Yanagisawa | .............. | 74/490.09 |
| 5,555,302 A * | 9/1996 | Wang | ........................... | 379/446 |
| 5,580,024 A * | 12/1996 | Briee | ........................... | 248/444 |
| 5,695,164 A * | 12/1997 | Hartmann et al. | ......... | 248/316.4 |
| 5,855,329 A * | 1/1999 | Pagano | ......................... | 248/451 |
| 6,206,426 B1 * | 3/2001 | Azzato | ........................... | 281/45 |
| 6,789,773 B2 * | 9/2004 | Holland | ....................... | 248/307 |
| 7,272,984 B2 * | 9/2007 | Fan | ............................. | 74/89.17 |
| 7,537,190 B2 * | 5/2009 | Fan | ............................ | 248/309.1 |
| 7,614,595 B2 * | 11/2009 | Richter | .................... | 248/346.01 |
| 2004/0056163 A1 * | 3/2004 | Holland | ....................... | 248/307 |
| 2005/0236536 A1 * | 10/2005 | Fan | .............................. | 248/176.3 |
| 2006/0278788 A1 * | 12/2006 | Fan | ............................. | 248/309.1 |
| 2007/0040089 A1 * | 2/2007 | Shiff | ............................. | 248/448 |
| 2007/0284500 A1 * | 12/2007 | Fan | .......................... | 248/346.06 |

* cited by examiner

*Primary Examiner* — Nkeisha J Smith
(74) *Attorney, Agent, or Firm* — Muncy, Geissler, Olds & Lowe, PLLC

(57) ABSTRACT

A roller type adjustable screen fixing apparatus includes: a fixing base, having at least one operating slot; at least one distal plate device disposed at an external side of the distal plate, having at least two distal plates embedded in the operating slot, and slidably moving in the operating slot, and a frame plate disposed at an external side of the distal plate; at least one linking device, having at least one roller installed in the operating slot and linked with the distal plate; and a containing space, defined by the upper frame plates of the corresponding distal plates for installing a screen. The distal plate is contractible in the operating slot for adjusting the containing space, such that the invention can fit screens of different sizes, and provide a convenient replacement and a dynamic adjustment.

19 Claims, 6 Drawing Sheets

ROLLER TYPE ADJUSTABLE SCREEN FIXING APPARATUS

BACKGROUND OF THE INVENTION

1. Field of the Invention

The present invention relates to a roller type adjustable screen fixing apparatus, and more particularly to a screen fixing apparatus flexibly installed around the periphery of a screen for changing the size and form of the screen to provide a very convenient and cost-effective apparatus with an easy and efficient installation.

2. Description of the Related Art

Electronic multimedia is generally used for advertising, and screen becomes a mainstream of such electronic advertising with dynamic multimedia audio/video effects. With reference to FIG. 1 for a structure of a conventional screen fixing base, the screen fixing base comprises: a fixing base 90, having a frame 91 and an embedding space 92 defined by the frame 91. When the structure is used, the fixing base 90 is mounted onto or embedded into a wall 100, and a screen 93 is installed and fixed at an embedding space 92 of the fixing base 90, such that the screen 93 can be used for audio and video advertising or propagandas. Although the fixing base 90 can achieve the effect of containing and positioning the screen 93, there are drawbacks, such as if the area or size of the screen 93 cannot meet the actual need and the fixing base 90 no longer can be used, it is necessary to exchange or expand the screen 93, or else the fixing base 90 will become a waste. The prior art is not cost-effective, or even causes an environmental issue for the disposal. If it is necessary to change the size of a screen 93 with a changed fixing base 90, the fixed base 90 has to be changed again. Obviously, the design of the structure of the conventional screen fixing base is not good enough. Therefore, it is an important subject for related manufacturers to develop a cost-effective screen fixing apparatus to overcome the shortcomings of the prior.

In view of the foregoing shortcomings of the conventional screen fixing base and its structural design, the inventor of the present invention based on years of experience in the related industry to develop a convenient and cost-effective roller type adjustable screen fixing apparatus to serve the general public and promote the related industry.

SUMMARY OF THE INVENTION

Therefore, it is a primary objective of the present invention to provide a roller type adjustable screen fixing apparatus extended or contracted from the periphery of the fixing base to fit screens of different sizes, and cover a larger range of generality to prevent the manufacturing and inventory issues of fixing bases of different sizes, so as to give better economic benefits to its manufacture.

Another objective of the present invention is to provide a roller type adjustable screen fixing apparatus capable of changing a screen of a different size conveniently and adjusting the screen dynamically, so as to provide better economic benefits to its use.

To achieve the objectives and effects of the present invention, the technical measures taken by the invention comprises: a fixing base, having mutually perpendicular operating slots disposed on both surfaces of said fixing base respectively; at least one distal plate device, having two distal plates, embedded into and positioned at the operating slot for sliding and moving correspondingly, and an external side of the distal plate having an upper frame plate; at least one linking device, having at least one roller installed in the operating slot, and linked with the distal plate; and a containing space, defined by upper frame plates of the pair of distal plates, for installing a screen.

The technical measure of the link rod type adjustable screen fixing apparatus further comprises: a fixing base, having two operating slots; two distal plate devices, having two first distal plates and two second distal plates, and the first distal plate and the second distal plate being positioned at the two operating slots respectively for sliding and moving, and external sides of the first distal plate and the second distal plate having an upper frame plate separately; a linking device, having a first roller and a second roller installed in the two operating slots respectively, and the first linking device being linked with the first distal plate, and the second linking device being linked with the second distal plate; and a containing space, defined by upper frame plates of the first distal plates and the second distal plates for installing a screen.

To make it easier for our examiner to understand the technical characteristics and effect of the present invention, we use preferred embodiments with accompanying drawings for the detailed description of the invention as follows:

DETAILED DESCRIPTION OF THE PREFERRED EMBODIMENTS

Figure 1:
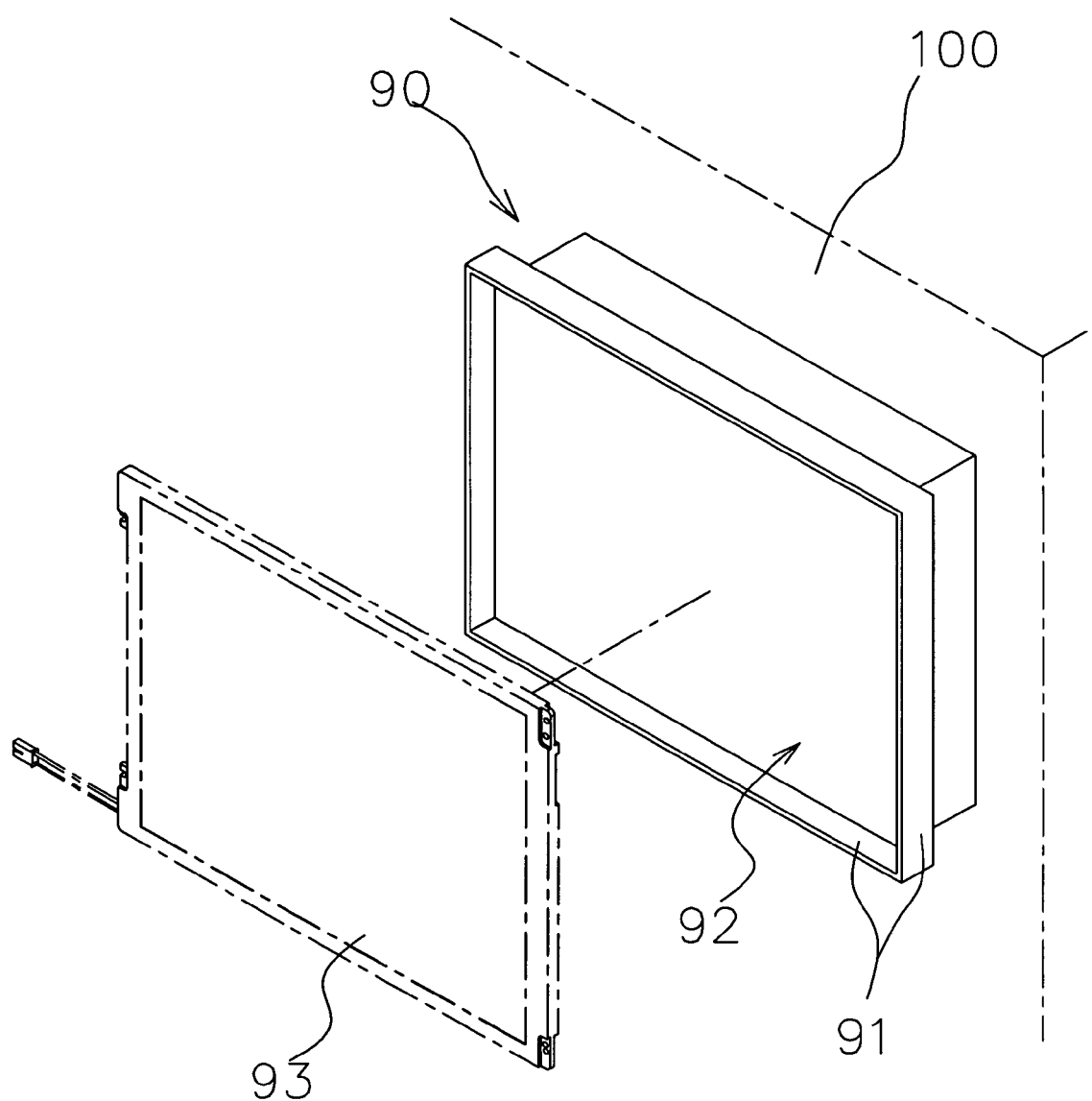
FIG. 1 is a schematic view of a structure of a screen fixing base in accordance with a prior art.
Figure 2:
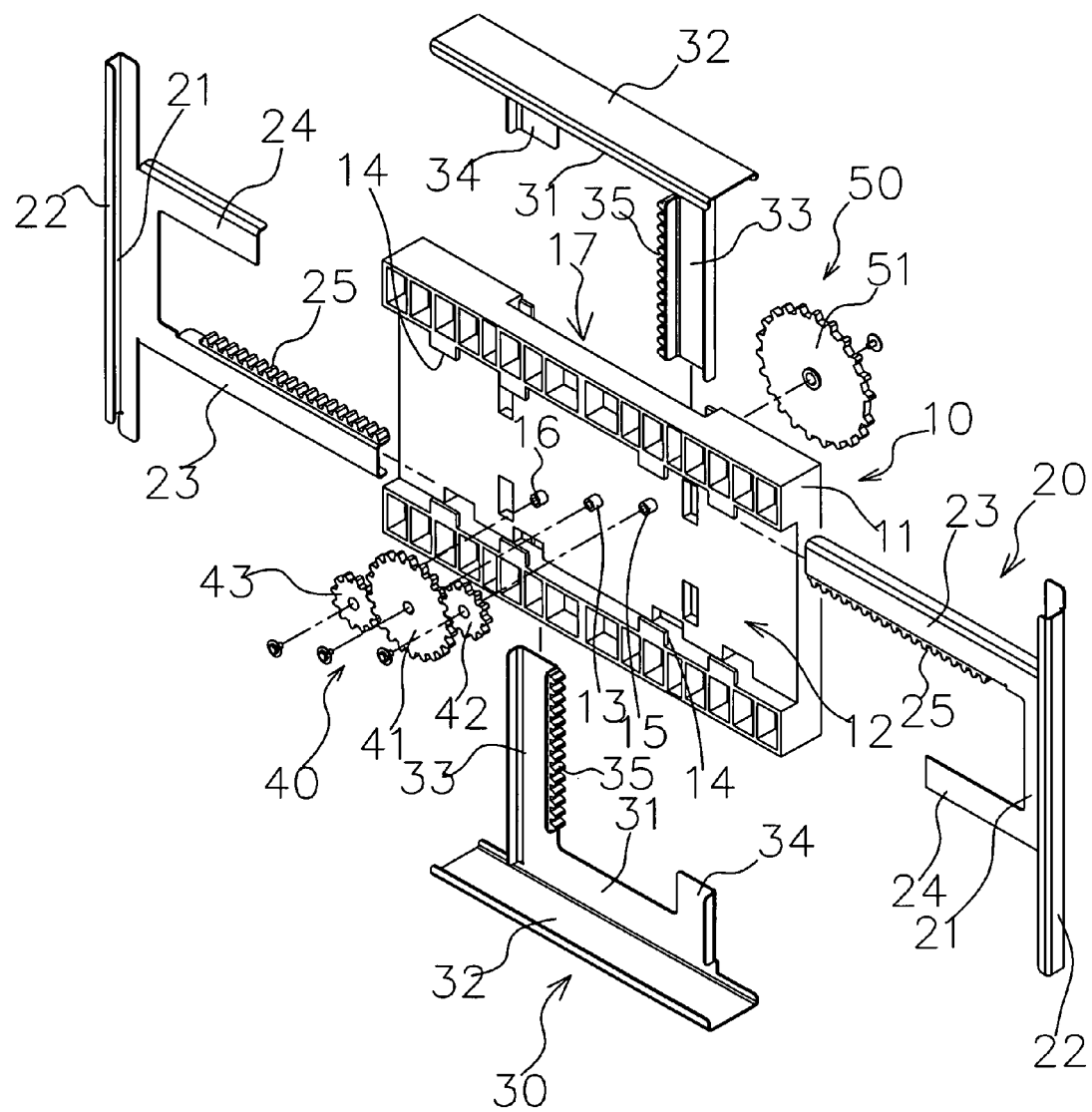
FIG. 2 is an exploded view of the present invention.
Figure 3:
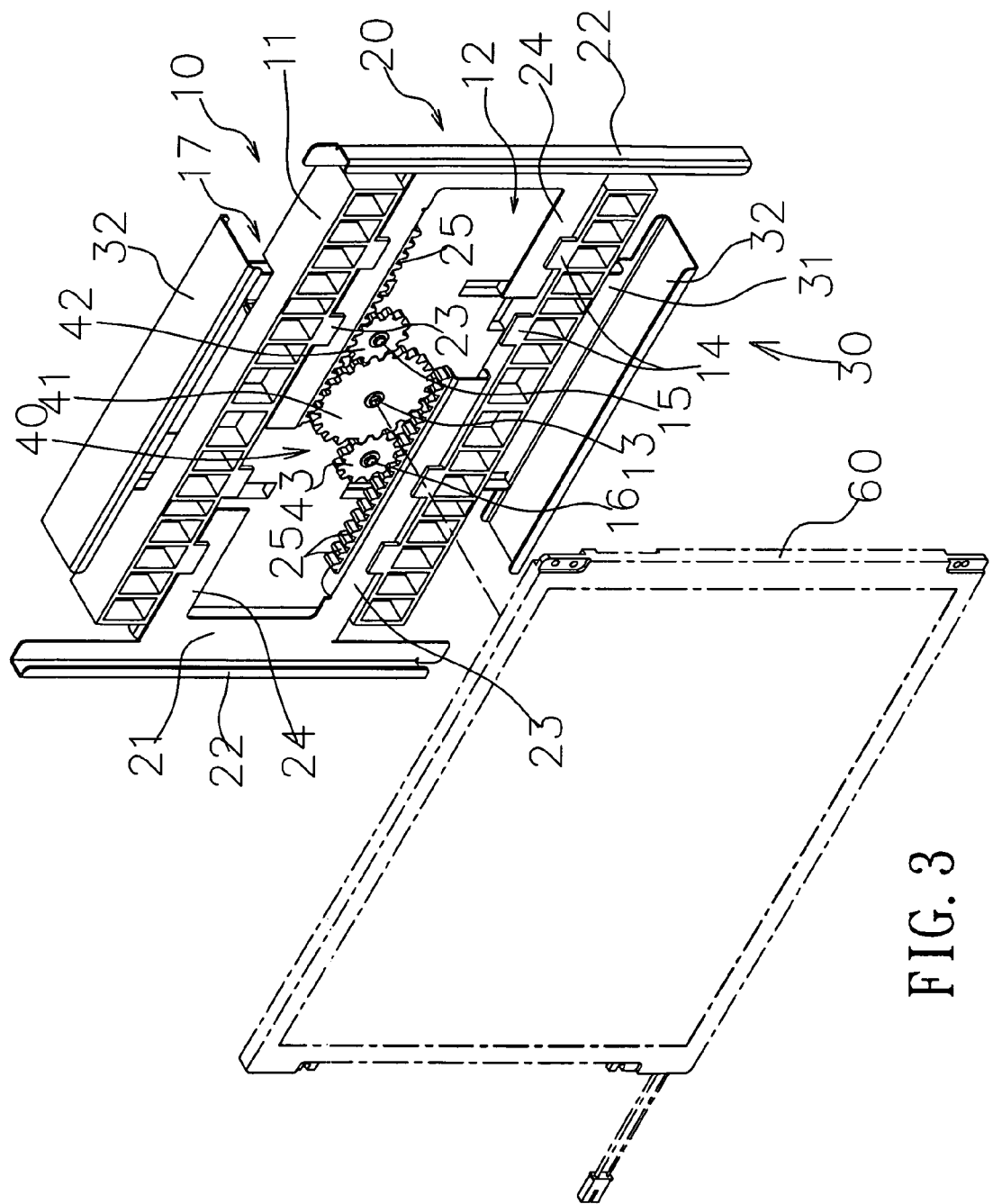
FIG. 3 is a schematic view of separating a screen fixing apparatus from a screen in accordance with the present invention.

With reference to FIGS. 2 and 3, a roller type adjustable screen fixing apparatus of the invention comprises: a fixing apparatus 10, a first distal plate device 20, a second distal plate device 30, a first linking device 40 and a second linking device 50, wherein the fixing apparatus 10 includes a fixing base 11 substantially in the shape of a plate, and having a transversal concave operating slot 12 in the middle of a side (a front side); the operating slot 12 includes a central positioning pillar 13 disposed in the middle of the operating slot 12, and both sides of the central positioning pillar 13 have a lateral positioning pillar 15, 16 each, and the lateral positioning pillars 15, 16 are generally not aligned on the same line and come with a slight height difference. In addition, both left and right sides of the fixing base 11 include a serrated press plate 14 disposed separately at a position corresponding to a connecting position of the corresponding operating slot 12 and protruded towards the operating slot 12. Another side (such as the rear side) of the fixing base 11 includes a longitudinal concave operating slot 17 disposed at the middle position, and both upper and lower sides of the fixing base 11 include a serrated press plate 18 disposed separately at a position corresponding to a connecting position of the corresponding operating slot 17 and protruded towards the operating slot 17, and the central positioning pillar 13 is protruded from the middle position of the operating slot 17.

The first distal plate device 20 includes two first distal plates 21, and the first distal plate 21 includes a frame plate 22, a long arm 23, and a short arm 24 extended towards the internal side (according to the assembling direction), and the long arm 23 and the short arm 24 are disposed at upper and lower ends (or lower and upper ends) respectively, and extended into the operating slot 12, wherein the long arm 23 has an abutting end 25 (such as a serrated end) disposed on a surface facing towards the operating slot 12. When the first distal plate device 20 is assembled, the first distal plates 21 are installed on both left and right sides of the operating slot 12, and the long arm 23 is disposed on the right side of the first distal plate 21, and the long arm 23 on the left side of the first distal plate 21 is disposed at the bottom.

The second distal plate device 30 includes two second distal plates 31, and the second distal plate 31 includes a frame plate 32 and a long arm 33 and a short arm 34 extended towards the internal end (according to the assembling direction), and the long arm 33 and the short arm 34 are disposed at upper and lower ends (or lower and upper ends) respectively, and extended into the operating slot 17, wherein the long arm 33 has an abutting end 35 (such as a serrated end) disposed on a surface facing towards the operating slot 17. When the second distal plate device 30 is assembled, the second distal plates 31 are disposed at both upper and lower ends of the operating slot 17, and the long arm 33 at the upper end of the second distal plate 31 is disposed on the right side, and the long arm 33 at lower end of the second distal plate 31 is disposed on the left side. The frame plates 22, 32 at the four sides are used to define a space for containing and mounting a screen 60.

The first linking device 40 includes a first roller 41, and a first transmission roller 42 and a second transmission roller 43 on both sides of the first roller 41 are installed at the position of the central positioning pillar 13 by means of serrations (or abutting), and the first transmission roller 42 and the second transmission roller 43 are installed at the lateral positioning pillars 15, 16, wherein the first transmission roller 42 is engaged with an abutting end 25 (with respect to the top of operating slot 12) at the first distal plate 21 on the right side by means of serrations (or abutting), and the second transmission roller 43 is engaged with an abutting end 35 (with respect to the bottom of the operating slot 12) at the first distal plate 21 on the left side by means of serrations (or abutting). Therefore, the two first distal plates 21 on both left and right sides can be separated or contacted sideway (in opposite operating directions) according to the link relations between the first transmission roller 42 and the first roller 41 and between the second transmission roller 43 and the first roller 41. The first roller 41, the first transmission roller 42 and the second transmission roller 43 are gears or any other wheels linked with each other, and the first transmission roller 42 and the second transmission roller 43 are gears or any other wheels linked with the abutting ends 25, 35.

Figure 5:
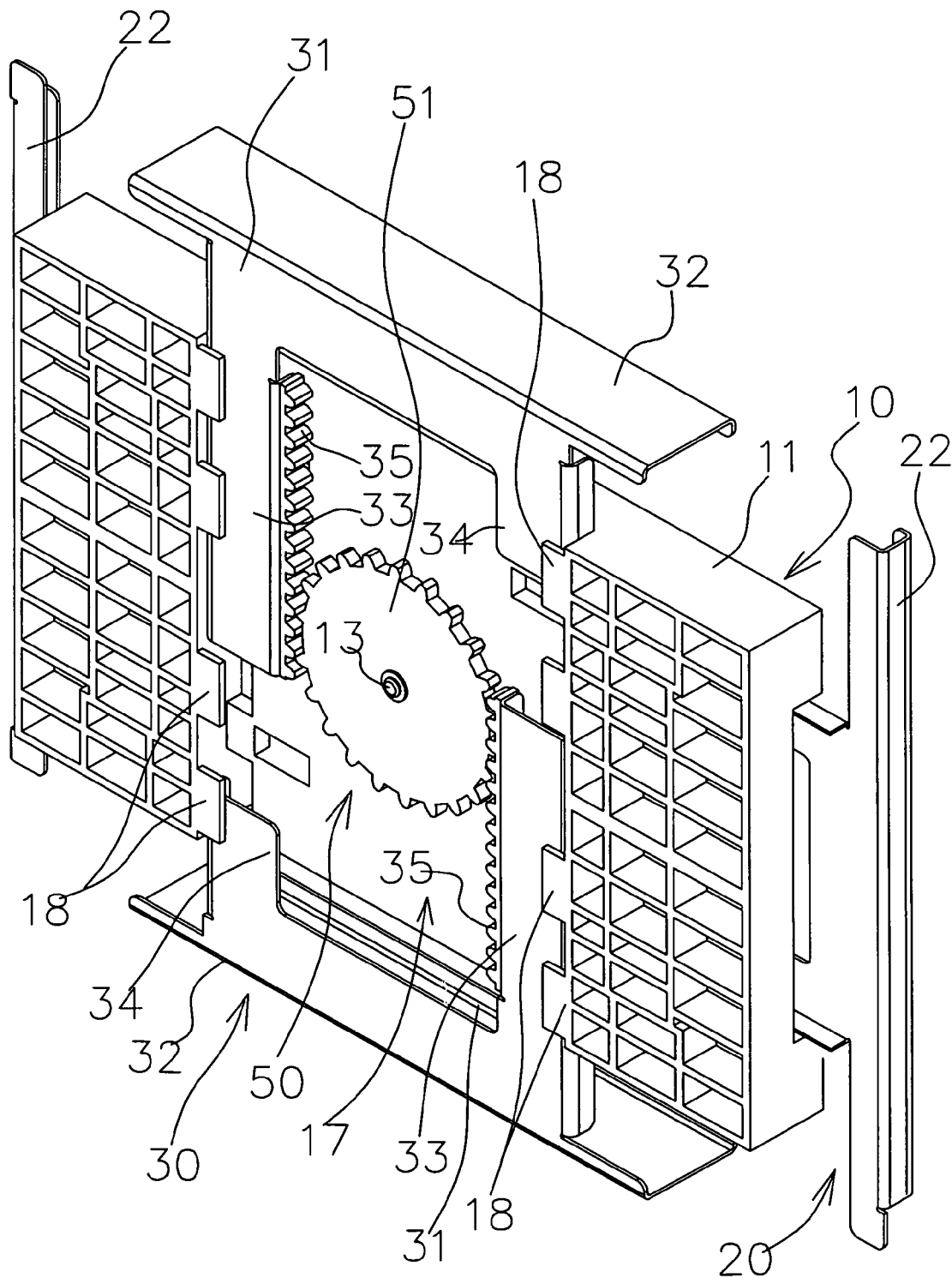
FIG. 5 is a schematic view of installing a second linking device in accordance with the present invention.

With reference to FIG. 5 together, the second linking device 50 includes a second roller 51 installed at the central positioning pillar 13 and disposed in the operating slot 17, and both sides of the second roller 51 are engaged with the abutting ends 35 of the second distal plates 31 on both sides by means of serrations (or abutting), such that the two upper and lower second distal plates 31 can be separated or attached vertically up and down (in opposite operating directions) according to the linking relation of the second roller 51, wherein the second roller 51 and the first roller 41 are rotated synchronously or independently, and the second roller 51 is a gear or any other wheel linked with the abutting end 35.

Figure 4:
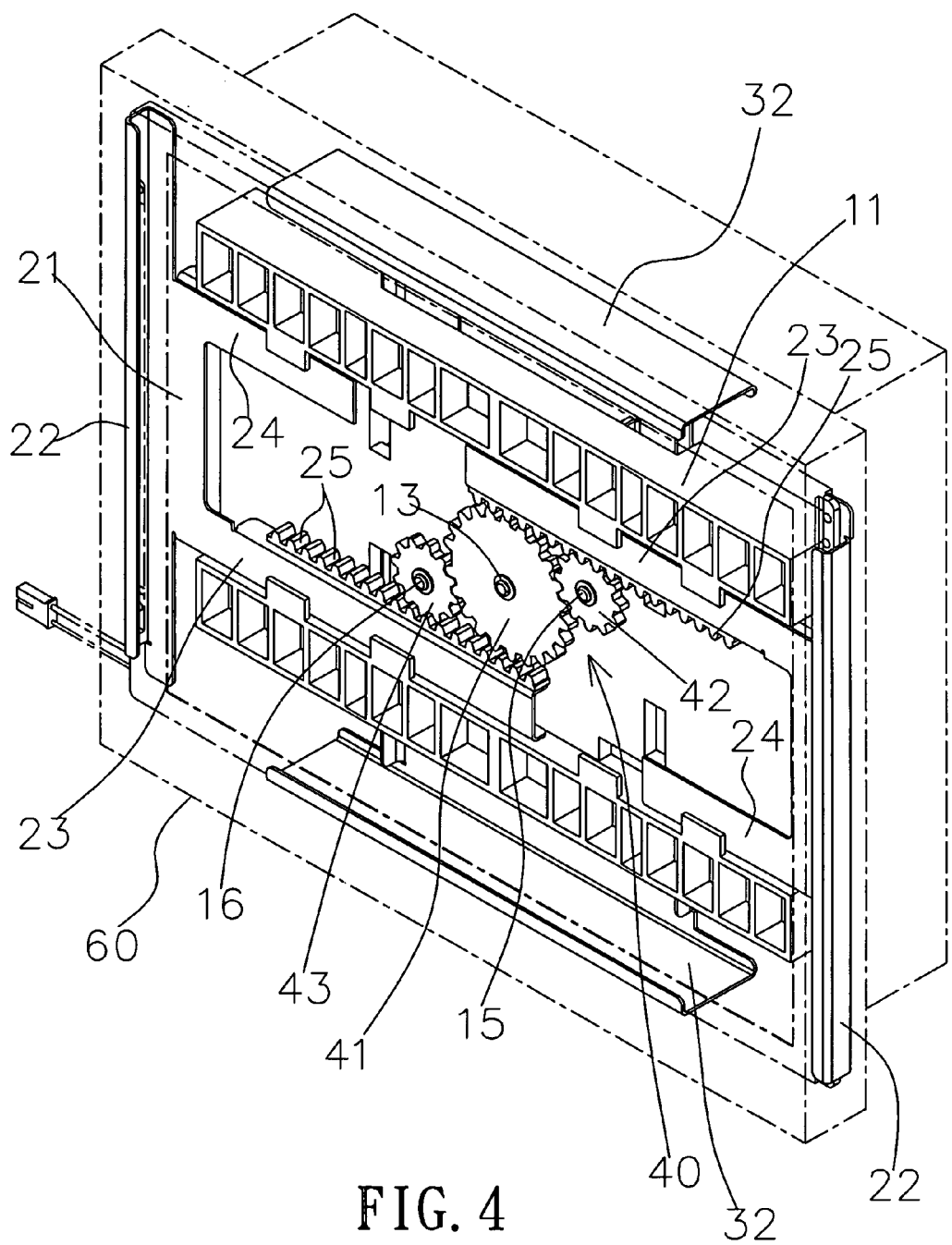
FIG. 4 a schematic view of combining a screen fixing apparatus with a screen in accordance with the present invention.

When the roller type adjustable screen fixing apparatus is assembled, the two first distal plates 21 are transversally embedded into both sides of the operating slot 12, and the first linking device 40 is installed in the middle of the operating slot 12 (as shown in FIGS. 3 and 4), and the first distal plate 21 can be slid and moved in the operating slot 12, and the first distal plate 21 is blocked by the press plate 14 and limited in the operating slot 12, such that the first distal plate 21 can be contracted transversally with respect to the first linking device 40 for an embedding operation. With the interface of the first linking device 40 for the transmission, the two left and right first distal plates 21 are displaced with the same distance. The two upper and lower second distal plates 31 are embedded longitudinally into both upper and lower ends of the operating slot 17, and the second linking device 50 is installed in the middle of the operating slot 17 (as shown in FIG. 5), such that the second distal plate 31 contracts the second linking device 50 longitudinally for an embedding operation. With the interface of the second linking device 50 for the transmission, the two upper and lower second distal plates 31 can be displaced with the same distance.

Figure 6:
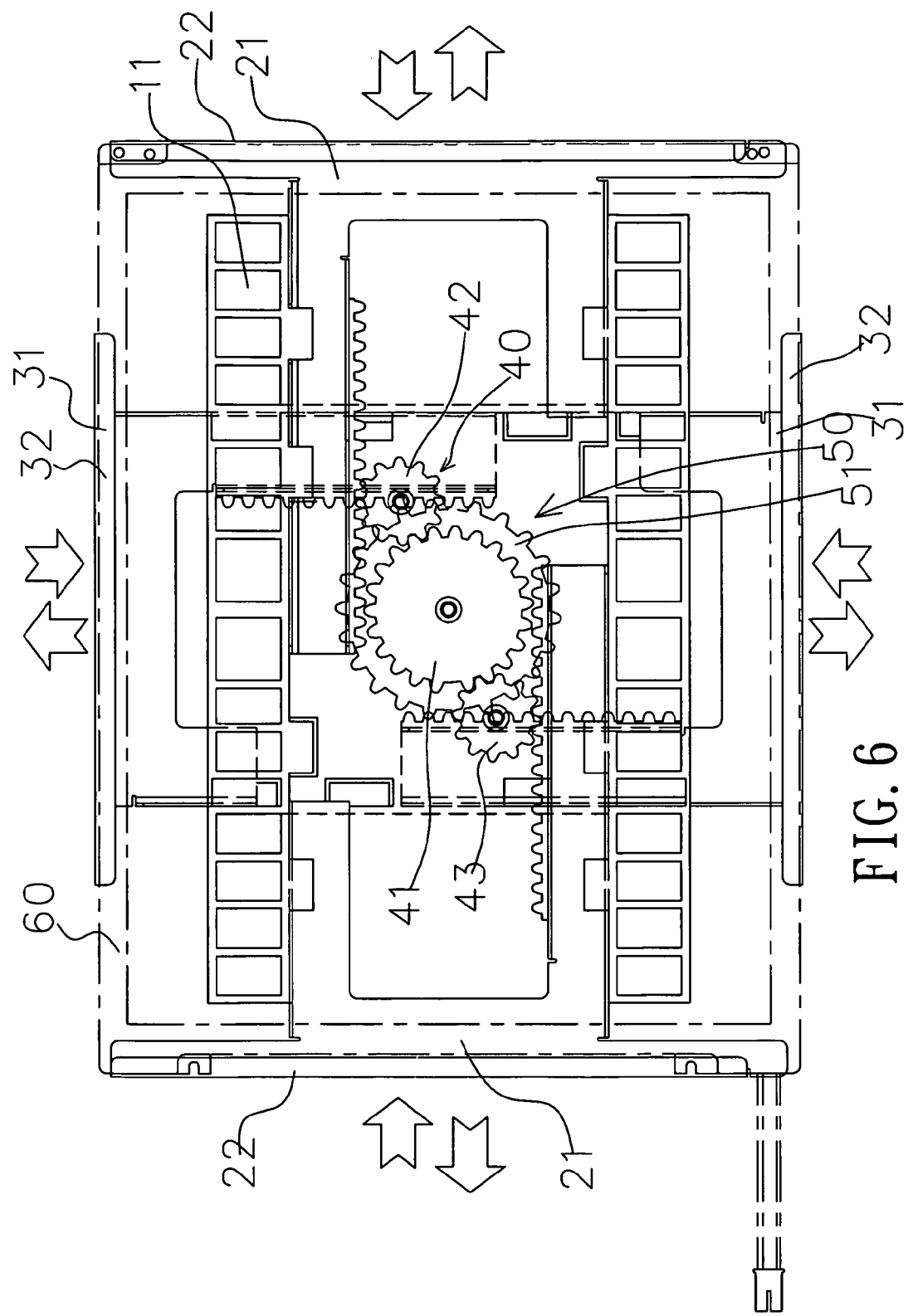
FIG. 6 is a schematic view of operating the present invention.

With reference to FIG. 6 for changing the screen 60 with a larger one in accordance with the present invention, the design of the first distal plate 21 and the second distal plate 31 combined with the first linking device 40 and the second linking device 50 respectively is used for pulling the first distal plate 21 (the frame plate 22) and the second distal plate 31 (the frame plate 32) to link the transmission of the first linking device 40 and the second linking device 50 respectively, such that the first distal plate 21 and the second distal plate 31 are extended equidistantly towards the external side in a transversal or longitudinal direction to increase the containing space formed by the frame plates 22, 32 for changing to a larger screen 60. Similarly, if it is necessary to change to a smaller screen 60, the aforementioned procedure is operated in a reverse order to decrease the containing space formed by the frame plate 22, 32 for the installation of a smaller screen 60.

The roller type adjustable screen fixing apparatus of the invention is installed into the longitudinal or transversal operating slot by means of the fixing base (at front side or rear side), and its longitudinal or transversal operating slot is provided for installing the distal plate (the two first distal plates or second distal plates) and the linking device (the first linking device or second linking device), such that the distal plate can be contracted or slid in the longitudinal or transversal operating slot, and the size of the containing space can be changed flexibly by the frame plates of the distal plates. The invention can fit screens of different sizes, and cover a larger range of generality to prevent the manufacturing and inventory issues of fixing bases of different sizes, so as to give better economic benefits to its manufacture.

While the invention has been described by means of specific embodiments, numerous modifications and variations could be made by those skilled in the art without departing from the scope and spirit of the invention set forth in the claims.

What is claimed is:

1. A roller type adjustable screen fixing apparatus, comprising:
   a fixing base, having mutually perpendicular operating slots disposed on both surfaces of said fixing base respectively;
   at least one distal plate device, having at least two distal plates embedded and positioned in at least one of said operating slots, and slidably moving in said at least one operating slot, and a frame plate disposed at an external side of said distal plate;

at least one linking device, having at least one roller installed in at least one of said operating slots and linked with said distal plate; and a containing space, defined by said frame plates of said corresponding distal plates for installing a screen.

2. The roller type adjustable screen fixing apparatus according to claim 1, wherein said roller is a gear or any other wheel.

3. The roller type adjustable screen fixing apparatus according to claim 1, wherein said at least one operating slot includes a positioning pillar disposed in a center of said at least one operating slot for installing said roller.

4. The roller type adjustable screen fixing apparatus according to claim 3, wherein at least one of said operating slots includes a lateral positioning pillar disposed separately on both sides of said central positioning pillar.

5. The roller type adjustable screen fixing apparatus according to claim 1, wherein said fixing base includes a press plate disposed at a position corresponding to a connecting position of said at least one operating slot and extended towards said at least one operating slot.

6. The roller type adjustable screen fixing apparatus according to claim 1, wherein said distal plate includes two transversally installed first distal plates or two longitudinally installed second distal plates.

7. The roller type adjustable screen fixing apparatus according to claim 1, wherein said distal plate includes a frame plate and at least one long arm extended to an internal side, and said long arm includes a serrated end or an abutting end disposed on a surface facing towards at least one of said operating slots.

8. The roller type adjustable screen fixing apparatus according to claim 7, wherein said distal plate further includes a short arm corresponding to said long arm.

9. The roller type adjustable screen fixing apparatus according to claim 1, wherein said linking device includes a first roller and a second roller installed on both surfaces of said fixing base respectively, and said first roller and said second roller are gears or any other wheels.

10. The roller type adjustable screen fixing apparatus according to claim 7, wherein said roller includes a first transmission roller and a second transmission roller disposed on both sides of said roller, and said first transmission roller and said second transmission roller are installed at said lateral positioning pillars on both sides of said central positioning pillar respectively, and said first transmission roller and said second transmission roller are abutted and connected with said serrated end or said abutting end of said corresponding distal plates respectively.

11. A roller type adjustable screen fixing apparatus, comprising:

a fixing base, having two operating slots;

two distal plate devices, including two first distal plates and two second distal plates, and said first distal plate and said second distal plate being positioned at said two operating slots respectively and slidably moving, and external surface of said first distal plate and said second distal plate having a frame plate;

a linking device, having a first roller and a second roller installed in said two operating slots respectively, and said first roller being linked with said first distal plate, and said second roller being linked with said second distal plate; and a containing space, defined by said corresponding frame plates of said first distal plate and said two second distal plates for installing a screen.

12. The roller type adjustable screen fixing apparatus according to claim 11, wherein said first roller and said second roller are gears or any other wheels.

13. The roller type adjustable screen fixing apparatus according to claim 11, wherein said two operating slots are perpendicular to each other and disposed on both surfaces of said fixing base respectively.

14. The roller type adjustable screen fixing apparatus according to claim 11, wherein said operating slot installed with said first roller further includes a central positioning pillar disposed in a center of said operating slot for positioning said first roller.

15. The roller type adjustable screen fixing apparatus according to claim 14, wherein said central positioning pillar includes a lateral positioning pillar disposed separately on both sides of said central positioning pillar, and said lateral positioning pillars include a first transmission roller and a second transmission roller respectively, and said first transmission roller and second transmission roller are gears or any other wheels.

16. The roller type adjustable screen fixing apparatus according to claim 11, wherein said fixing base includes a press plate disposed at a position corresponding to a connecting position of at least one of said operating slots and protruded towards at least one of said operating slots.

17. The roller type adjustable screen fixing apparatus according to claim 15, wherein said two first distal plates and two second distal plates include a frame plate and at least one long arm extended towards an internal end, and said long arm includes a serrated end or an abutting end disposed on a surface facing towards said operating slot.

18. The roller type adjustable screen fixing apparatus according to claim 17, wherein said two first distal plates and said two second distal plates further includes a short arm corresponding to said long arm.

19. The roller type adjustable screen fixing apparatus according to claim 17, wherein said first transmission roller and said second transmission roller are abutted and connected to said serrated end or said abutting end of said corresponding first distal plates respectively.

* * * * *